(12) United States Patent
Miyazaki et al.

(10) Patent No.: US 7,815,966 B2
(45) Date of Patent: Oct. 19, 2010

(54) PRODUCTION PROCESS OF LIGHT AMOUNT ADJUSTMENT MEMBER, LIGHT AMOUNT ADJUSTMENT MEMBER, LIGHT AMOUNT ADJUSTMENT DEVICE AND PHOTOGRAPHING APPARATUS

(75) Inventors: Takeshi Miyazaki, Kanagawa (JP); Ichiro Onuki, Kanagawa (JP); Masataka Yashima, Tokyo (JP); Akio Kashiwazaki, Kanagawa (JP); Eriko Namazue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2374 days.

(21) Appl. No.: 10/367,765

(22) Filed: Feb. 19, 2003

(65) Prior Publication Data

US 2004/0021758 A1 Feb. 5, 2004

(30) Foreign Application Priority Data

Feb. 19, 2002 (JP) ............................. 2002-041623
Feb. 19, 2002 (JP) ............................. 2002-041634

(51) Int. Cl.
*B05D 5/06* (2006.01)
(52) U.S. Cl. ...................................... 427/164
(58) Field of Classification Search ................ 427/162, 427/164
See application file for complete search history.

(56) References Cited

U.S. PATENT DOCUMENTS

| | | | | |
|---|---|---|---|---|
| 5,479,298 A | 12/1995 | Yanagi et al. | ............... | 359/888 |
| 5,725,959 A | 3/1998 | Terada et al. | ................ | 428/448 |
| 5,736,278 A * | 4/1998 | Nakazawa et al. | ............ | 430/7 |
| 5,972,544 A | 10/1999 | Carr et al. | ....................... | 430/7 |
| 6,162,510 A * | 12/2000 | Kashiwazaki et al. | ....... | 427/511 |
| 6,180,294 B1 | 1/2001 | Shiba et al. | ..................... | 430/7 |
| 6,697,137 B2 | 2/2004 | Nemoto et al. | .............. | 349/113 |

FOREIGN PATENT DOCUMENTS

| | | |
|---|---|---|
| JP | 1-252944 | 10/1989 |
| JP | 4-151102 | 5/1992 |
| JP | 5-173004 | 7/1993 |
| JP | 6-95208 | 4/1994 |
| JP | 6-273601 | 9/1994 |
| JP | 10-96971 | 4/1998 |

(Continued)

OTHER PUBLICATIONS

European Search Report dated Apr. 11, 2003 (Ref. No. EP 37621).

*Primary Examiner*—Timothy H Meeks
*Assistant Examiner*—Elizabeth Burkhart
(74) *Attorney, Agent, or Firm*—Fitzpatrick, Cella, Harper & Scinto (57) ABSTRACT

A production process of a light amount adjustment member, by which a light amount adjustment member that can sufficiently satisfy optical properties can be economically produced at low production cost and high yield by a simple operation is provided. In addition, a wide variety of light amount adjustment devices and photographing apparatus equipped with a light amount adjustment member are cheaply provided while achieving satisfactory optical properties. The production process of the light amount adjustment member comprises the step of applying a coloring liquid containing a coloring material to a transparent base material using a liquid jet recording process to form a light amount adjustment region having a particular optical density.

4 Claims, 4 Drawing Sheets

FOREIGN PATENT DOCUMENTS

| JP | 10-133254 | 5/1998 |
| JP | 11-15042 | 1/1999 |
| JP | 2000-187113 | 7/2000 |
| JP | 2000-352736 | 12/2000 |
| JP | 2001-324713 | 11/2001 |

* cited by examiner

PRODUCTION PROCESS OF LIGHT AMOUNT ADJUSTMENT MEMBER, LIGHT AMOUNT ADJUSTMENT MEMBER, LIGHT AMOUNT ADJUSTMENT DEVICE AND PHOTOGRAPHING APPARATUS

BACKGROUND OF THE INVENTION

1. Field of the Invention

The present invention relates to a production process of a light amount adjustment member, by which a light amount adjustment member which can be usefully used in a wide variety of fields such as optical instruments such as digital cameras and video cameras, and electrophotographic recording apparatus can be provided with ease, a light amount adjustment member obtained thereby, a light amount adjustment device, and a photographing apparatus.

2. Related Background Art

In an image forming (photographing) optical system used in an optical instrument such as a camera, is generally contained a light amount adjustment device that controls light quantity of an incident beam, i.e., the so-called diaphragm blade device. In such a diaphragm device, a plurality of diaphragm blades form an opening of a prescribed area, and the quantity of a beam passing through the opening is controlled by controlling an opening diameter of the opening by an actuator. However, an influence of diffraction caused at an end of the diaphragm blade becomes great as the opening diameter of the opening is made small, so that the image forming performance of the image forming optical system is deteriorated. On the other hand, there has been known a technique that a filter as a light amount adjustment member is provided at a part of the diaphragm blade in order to avoid this defect, thereby attenuating the quantity (light quantity) of a bundle of rays passing through the opening by the optical filter instead of making the opening diameter small. The optical filter used for such purposes is required to lessen optical defects such as light scattering, refraction abnormality and spectral transmittance deviation.

That generally used as the light amount adjustment member in the past is of the type that a light-absorbing coloring material such as a pigment or dye is mixed and incorporated into a transparent film-forming material to form a colored film. However, light amount adjustment members produced by this method have been very expensive and have not sufficiently met cost reduction required of increasing demand. In addition, the method that the coloring material is incorporated into the transparent film-forming material to form the colored film has been markedly difficult to produce a light amount adjustment member having a continuous or stepwise density distribution (hereinafter referred to as "multi-density").

Another known production method of the light amount adjustment member includes a method of a multi-density light amount adjustment member by using a silver halide film (see Japanese Patent Application Laid-Open No 5-173004). However, the light amount adjustment member obtained by this method causes a problem characteristic of the use of the silver halide film that the rectilinearity of rays passed through a filter is impaired by reflection of a beam on the surfaces of silver particles contained in the filter and diffraction of a beam passed through ends of the silver particles to deteriorate the image forming performance of the optical system.

A method of producing a multi-density light amount adjustment member by a vapor deposition method is also disclosed (see Japanese Patent Application Laid-Open No. 10-133254). However, this method incurs increase in production cost and is thus expensive. In addition, since the film thickness thereof varies according to the density, a problem that a difference in film thickness arises between a high-density portion and a low-density portion, and consequently, an optical path difference arises to deteriorate resolution. Further, according to this method, a light amount adjustment member which the density distribution varies stepwise can be produced, but that having a continuously varied density distribution is considerably difficult to produce.

There has also been proposed a process of producing a multi-density light amount adjustment member by first incorporating organic coloring matter which fades by light in a film forming material, and partially irradiating the resultant film with high-energy light, thereby decomposing the organic coloring matter at irradiated portions (see Japanese Patent Application Laid-Open No. 10-96971). However, according to this process, usable coloring materials are limited to those which fades by light. It is therefore very difficult to obtain a product having sufficient optical properties. In addition, it may be easily inferred that resulting products will become expensive because of the complicated production process.

It is further disclosed to form a film having a single density in the form of halftone dots by vapor deposition or a printing process such as a photomechanical process and to vary a halftone dot pattern from position to position, thereby producing a filter as a light amount adjustment member that a transmittance varies steplessly (see Japanese Patent Application Laid-Open No. 2000-352736). However, in such a process, a film of a prescribed density is formed by the photomechanical process or vapor deposition. Even if either process is adopted, a problem that the apparatus becomes large and expensive, and so the production cost of the filter becomes high.

SUMMARY OF THE INVENTION

It is an object of the present invention to provide a production process of a light amount adjustment member, by which the above-described problem of the prior art can be solved, and a light amount adjustment member that can sufficiently satisfy optical properties can be economically produced at low production cost and high yield by a simple operation.

Another object of the present invention is to cheaply provide a wide variety of light amount adjustment devices and photographing apparatus equipped with a light amount adjustment member while achieving sufficient optical properties by cheaply and simply producing the light amount adjustment member that can sufficiently satisfy optical properties by the above-described simple production process.

The above objects can be achieved by the present invention described below.

In an aspect of the present invention, there is thus provided a process for producing a light amount adjustment member, which comprises the steps of providing a transparent base material having a layer composed of a material capable of absorbing a coloring liquid and applying the coloring liquid containing a coloring material to the layer using a liquid jet recording process to form a light amount adjustment region having a particular optical density.

In another aspect of the present invention, there is also provided a process for producing a light amount adjustment member, which comprises the steps of applying a coloring liquid containing at least a transparent resin and a coloring material on to a transparent base material by means of a liquid jet recording process and curing the transparent resin to form a light amount adjustment region having a particular optical density.

In a further aspect of the present invention, there is provided a light amount adjustment member produced by one of the above-described production processes of a light amount adjustment member.

In a still further aspect of the present invention, there is provided a light amount adjustment device for controlling a beam passing through an opening having a prescribed opening diameter, which comprises a first region for giving a prescribed transmittance to the beam and a second region for interrupting the beam, wherein the first region is composed of the light amount adjustment member described above.

In a yet still further aspect of the present invention, there is provided a photographing device which comprises the light amount adjustment device described above, a photographing optical system for forming a subject image, an image pickup means for photoelectrically converting the subject image formed and a recording means for recording a signal photoelectrically converted, wherein the light amount adjustment device is arranged in the photographing optical system.

According to the production processes of the light amount adjustment device according to the present invention, a light amount adjustment member having a continuous or stepwise density distribution in particular may be simply provided.

DETAILED DESCRIPTION OF THE PREFERRED EMBODIMENTS

The present invention will hereinafter be described in more detail by the preferred embodiments of the present invention.

First Embodiment

The production process of a light amount adjustment member according to the present invention comprises applying a coloring liquid containing a coloring material to a transparent base material having a layer composed of a material capable of absorbing a coloring liquid using a liquid jet recording process, thereby causing the coloring liquid to be received in the base material to form a light amount adjustment region having a particular optical density capable of controlling a quantity of a beam transmitted. In this process, the step of forming the colored layer may be performed subsequently to a step of forming the layer composed of the material capable of absorbing the coloring liquid. A coating method used in the case where the layer composed of the material capable of absorbing the coloring liquid is formed, and materials used therefor will hereinafter be described.

In order to form the layer capable of receiving the coloring liquid on the transparent base material, a material, which will be described subsequently, is first dissolved or dispersed in water, an alcohol, a polyhydric alcohol or a proper any other organic solvent together with other additives as needed, thereby preparing a coating formulation. The resultant coating formulation is then applied to the surface of the base material by a roll coater, blade coater, air-knife coater, gate roll coater, bar coater, size press, spray coating, gravure coater, curtain coater or spin coating process, or the like. The coating formulation thus applied is then dried by means of, for example, a hot air drying oven, heated drum, hot plate or the like to form a receptive layer capable of absorbing and receiving the coloring liquid.

No particular limitation is imposed on the transparent base material usable in the present invention so far as it has necessary properties such as mechanical strength as a light amount adjustment member and optical properties. As examples thereof, may be mentioned transparent filmy base materials composed of polyethylene terephthalate, diacetate, triacetate, cellophane, celluloid, polycarbonate, polyimide, polyvinyl chloride, polyvinylidene chloride, polyacrylate, polyethylene, polypropylene or the like. A glass base material may also be used so far as it satisfies the above-described necessary properties.

No particular limitation is imposed on the material for the coating formulation in the case where the layer capable of absorbing the coloring liquid provided on such a transparent base material as described above is formed, so far as the coloring liquid is absorbed in the layer formed by such a material, and a coloring material in the coloring liquid can be received and fixed. However, water-soluble resins and water-dispersing resins are preferably used.

As examples of the water-soluble resins, may be mentioned synthetic resins, such as polyvinyl alcohol and modified product of polyvinyl alcohol, such as anionically modified polyvinyl alcohol, cationically modified polyvinyl alcohol and acetal-modified polyvinyl alcohol; hydrophilic polyurethane; polyvinyl pyrrolidone and modified products of polyvinylpyrrolidone, such as vinylpyrrolidone-vinyl acetate copolymers, vinylpyrrolidone-dimethylaminoethyl methacrylate copolymers, quaternized vinylpyrrolidone-dimethylaminoethyl methacrylate copolymers and vinylpyrrolidone-methacrylamidopropyltrimethylammonium chloride copolymers; cellulosic water-soluble resins such as carboxymethyl cellulose, hydroxyethyl cellulose and hydroxypropyl cellulose, and modified products of cellulose, such as cationic hydroxyethyl cellulose; polyester, polyacrylic acid (esters), melamine resins and modified products thereof; and graft copolymers containing at least polyester and polyurethane; and natural resins such as albumin, gelatin, casein, starch, cationic starch, gum arabic and sodium alginate.

As examples of the water-dispersing resins, may be mentioned a large number of resins such as polyvinyl acetate, ethylene-vinyl acetate copolymers, polystyrene, styrene-(meth)acrylic ester copolymers, (meth)acrylic ester polymers, vinyl acetate(meth)acrylic acid (ester) copolymers, poly(meth)acrylamide, (meth)acrylamide copolymers, styrene-isoprene copolymers, styrene-butadiene copolymers, styrene-propylene copolymers, poly(vinyl ether) and silicone-acrylic copolymers. It goes without saying that the present invention is not limited thereto.

Those of the void-absorbed type in which the above-described water-soluble resin or water-dispersing resin is used as a binder, and, for example, a pigment such as alumina hydrate, silica, calcium carbonate is mixed with such a material may also be used within limits satisfying the optical properties.

In order to control coating ability and absorbing performance of the coloring liquid and to improve mechanical properties, various kinds of surfactants, crosslinking agents, dye sticking agents (water-proofing agents), antifoaming agents, antioxidants, viscosity modifiers, pH adjustors, mildewcides and plasticizers, and the like may be contained in the coating formulation in addition to the above-described material as needed.

In the present invention, the coloring liquid containing a coloring material is applied to the layer capable of absorbing the coloring liquid provided on such a transparent base material as described above by a liquid jet recording process to cause the coloring liquid to be absorbed and received in the layer, thereby forming a light amount adjustment region having a particular optical density to form the light amount adjustment member. No particular limitation is imposed on the coloring liquid used at this time so far as it can be ejected by a micro liquid droplet ejecting apparatus.

In the present invention, any of water-based and oil-based coloring liquids may be used as the coloring liquid. The water-based coloring liquid may preferably be used from the viewpoint of ejection reliability. As a coloring material in the coloring liquid, may be used any of various kinds of dyes and pigments. However, various kinds of metals, inorganic fine particles, organic fine particles, etc. may also be used. Incidentally, the coloring material making up the coloring liquid in the present invention means a material that controls the transmittance of light within a prescribed wavelength band including visible light, ultraviolet light and infrared light. In other words, in the case where an ND filter (neutral density filter) is produced in accordance with the production process of the light amount adjustment member according to the present invention, for example, that giving even transmission properties over the whole visible light band is utilized as the coloring material. However, the present invention is not limited thereto. In the case where a light amount adjustment member used in, for example, a light amount adjustment device for infrared cameras is formed, it is necessary to use a material that transmits only particular wavelengths in an infrared band. This material is also included in the coloring materials. Those in which absorption of light in controlling a quantity of light transmitted occurs in the interior of the material or at the surface of the material are also included in the coloring materials used in the present invention.

As a solvent that is a material for forming the coloring liquid used in the present invention, a hydrophilic medium may preferably be used. As the hydrophilic medium, any of such various kinds of water-soluble organic solvents as described below may be used. Specific examples thereof include alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketone alcohols such as acetone and diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols the alkylene group of which has 2 to 6 carbon atoms, such as ethylene glycol, propylene glycol, trimethylene glycol, triethylene glycol and 1,2,6-hexanetriol; glycerol; lower alkyl ethers such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (diethyl) ether and tetraethylene glycol dimethyl (diethyl) ether; alkanolamines such as monoethanolamine, diethanolamine and triethanolamine; sulfolane; N-methyl-2-pyrrolidone; 2-pyrrolidone; and 1,3-dimethyl-2-imidazolidinone. Such water-soluble organic solvents as described above may be used either singly or in any suitable combination thereof.

In order to provide a coloring liquid having desired physical properties, various kinds of surfactants, antifoaming agents, preservatives and the like may be added to the coloring liquid used in the present invention in addition to the above-described components as needed.

In the present invention, the coloring liquid composed of such material as described above is applied on to the transparent base material, on the surface of which the above-described layer capable of absorbing and receiving the coloring liquid has been applied, by means of a micro liquid droplet ejecting apparatus to form a light amount adjustment region having a particular optical density. No particular limitation is imposed on a method for applying the coloring liquid by the micro liquid droplet ejecting apparatus used at this time. For example, that of the Bubble Jet (trademark) type that an electrothermal converter is used as an energy-generating element, or that of the piezo-jet type that a piezoelectric element is used may be used. A commercially available general-purpose printer may be used as the micro liquid droplet ejecting apparatus as a printer. However, the present invention is not limited thereto, and a printer exclusively produced for the present invention may also be used.

Figure 4:
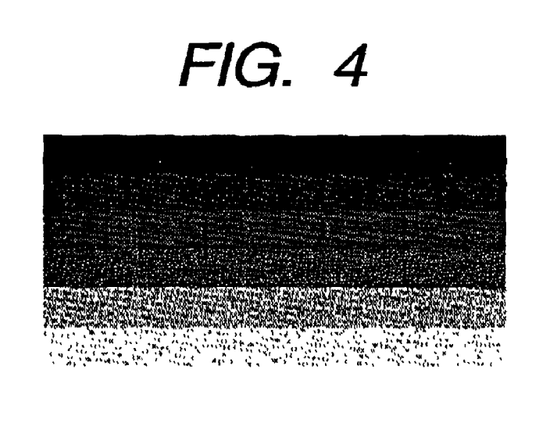
FIG. 4 illustrates a light amount adjustment member having a density gradient that varies stepwise.

No particular limitation is imposed on a pattern of applying the coloring liquid, and the coloring liquid may be applied either evenly on the whole surface or on the gradation pattern with such a stepwise density gradient as shown in FIG. 4. Further, the pattern may be a gradation pattern in such a state that stepwise difference in density is indefinite with a continuous density gradient provided. According to the production process by the present invention, a light amount adjustment member having a continuous or stepwise density gradient can be simply produced. Since the degree of freedom of a method of forming the density gradient pattern is high, the production process has such a merit that optical suitability is made easy.

In order to suitably retain optical properties that may be affected by the optical thickness and surface roughness of the resulting light amount adjustment member, it is preferred that the liquid droplet volume and impact dot diameter of the coloring liquid applied by a liquid droplet jet recording process be smaller because a difference in receptive layer thickness caused by a local difference in the quantity of the coloring liquid applied becomes small. For such reasons, the coloring liquid is preferably applied in such a manner that the area of one dot of the coloring liquid formed by applying the coloring liquid on to the layer amounts to at most a twentieth of the area of the light amount adjustment region, preferably at most a fiftieth of the area. It is desirable that the light amount adjustment region be equivalent to or somewhat greater than the diameter of a beam to be controlled. The diameter of the beam herein depends on optical specifications (focal length, F number, etc.) of an optical system of which the light quantity control device is applied. However, it is considered to be at most about 5 mm.

The surface roughness (Ra) of the resulting light amount adjustment region is preferably at most 5/1, more preferably at most 1/10 of the wavelength of light the light quantity of which is to be controlled.

Figure 1A:
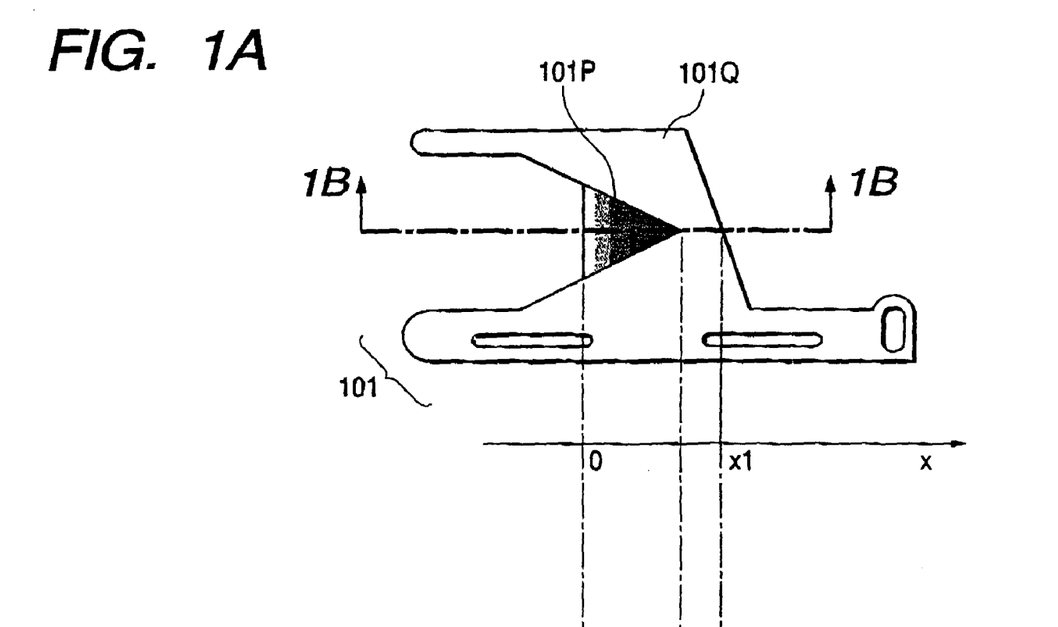
FIGS. 1A and 1B illustrate a diaphragm blade equipped with a light amount adjustment member according to the present invention.
Figure 1B:
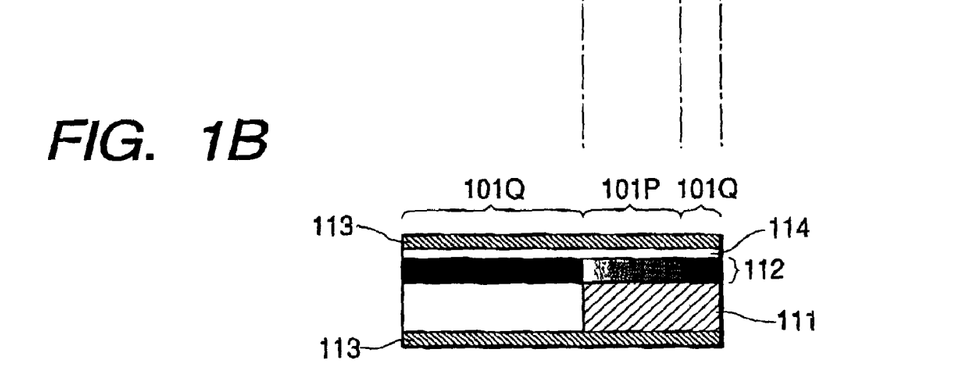

A diaphragm blade equipped with a light amount adjustment member obtained by the production process according to this embodiment is shown in FIGS. 1A and 1B. A specific process for forming a light amount adjustment region by applying a coloring liquid containing a coloring material to a layer composed of a material capable of absorbing the coloring liquid provided on a transparent base material using a liquid jet recording process will hereinafter be described. The diaphragm blade illustrated in FIGS. 1A and 1B is constructed by a light amount adjustment member 101P (gradation portion in FIG. 1A) having a light amount adjustment region to which a prescribed transmittance has been imparted, and a light interrupting member 101Q (another portion than the gradation portion) for interrupting light. A transparent base material is first provided, and a layer composed of a material capable of absorbing the coloring liquid is provided on at least one surface of the transparent base material. For example, the coloring liquid containing the coloring material is then applied with a stepwise density gradient to the layer on the transparent base material by an ink-jet printer as a micro liquid droplet ejecting apparatus to form a light amount adjustment member 101P having a gradation pattern. Both members of the light amount adjustment member 101P formed by the above-described process and the light interrupting member 101Q are combined with each other, thereby producing a diaphragm blade that is an example of the light amount adjustment member.

In the process of this embodiment, after the coloring liquid is applied in the above-described manner, the coloring liquid thus applied may be dried by means of a hot air drying oven, heated drum, hot plate or the like as needed. In particular, a method in which a crosslinking agent is mixed into the material for forming the layer capable of absorbing the coloring liquid, and a film formed on the transparent base material is cured by heating or light irradiation to complete the light amount adjustment region is also useful.

In this embodiment, a transparent flattening layer may also be provided on the surface of the light amount adjustment region formed by applying the coloring liquid by such a process as described above as needed. No particular limitation is imposed on a material usable in the formation of the flattening layer so far as it is such a material capable of receiving the coloring liquid as described above and satisfies necessary performance such as adhesiveness to such a layer, mechanical strength and optical properties.

Specifically, for example, a process in which an acrylic or epoxy thermosetting resin or photo-setting resin is used, a coating formulation comprising such a resin material is applied on to the surface of the light amount adjustment region to form a coating film, and the base material is then baked by means of an oven, hot plate or the like to form a cured coating film, a process in which the base material is irradiated with an electron beam, ultraviolet light or the like to form a cured coating film, or the like may be used. The thickness of the flattening layer formed at this time varies according to required performance. However, the thickness is suitably, for example, about 0.1 to 30 μm.

In addition, an anti-reflection coating may also be formed on both surfaces of the light amount adjustment member obtained in such a manner. The anti-reflection coating is required to have excellent anti-reflection properties in a visible light band and excellent barrier properties to water and harmful gasses. In order to satisfy these requirements, vapor deposition multi-layer films composed of inorganic materials are suitably used. For example, the anti-reflection coatings described in Japanese Patent Application Laid-Open No. 06-273601 by the present applicant may be used to prevent occurrence of stray light by surface reflection of the filter and moreover to shut off water and harmful gasses to prevent deterioration of the coloring material.

In other words, as the anti-reflection coating composed of the above-described vapor deposition multi-layer film of the inorganic materials, such a film of the structure formed of undercoat layers vapor-deposited on both surfaces of the light amount adjustment member and a repeated multi-layer film deposited thereon as described below is preferably used. More specifically, as the undercoat layer, is preferably a thin film having a film thickness d of 200 to 300 nm formed of from low-refractive index material having a refractive index n of 1.49 to 1.59 comprising, as a main component, silicon oxide $SiO_x$ ($2>x>1$) having good adhesiveness to the synthetic resin material forming the outermost layer of the light amount adjustment member and excellent chemical resistance and wear resistance. The multi-layer film deposited on the undercoat layer is preferably formed by a thin film of a first layer composed of a high-refractive index material comprising, as a main component, titanium oxide $TiO_2$, zirconium oxide $ZrO_2$ or a mixture thereof, a thin film of a second layer deposited thereon and formed of a low-refractive index material comprising, as a main component, silicon oxide $SiO_x$ ($2 \geq x \geq 1$), a thin film of a third layer deposited thereon and composed of a high-refractive index material comprising, as a main component, titanium oxide $TiO_2$, zirconium oxide $ZrO_2$ or a mixture thereof, and a thin film of a fourth layer deposited thereon and formed of a low-refractive index material comprising, as a main component, silicon oxide $SiO_x$ ($2 \geq x \geq 1$).

The optical predominance in the case where the optical density of the light amount adjustment member is varied stepwise or continuously are described in, for example, Japanese Patent Application Laid-Open Nos. 6-95208 and 11-15042. On the other hand, the investigation by the present inventors has revealed that when the light amount adjustment member produced simply by the process according to this embodiment, the optical density of which varies stepwise or continuously, is applied to a diaphragm device, the same effects as in the publicly known techniques described above can be achieved.

Figure 2:
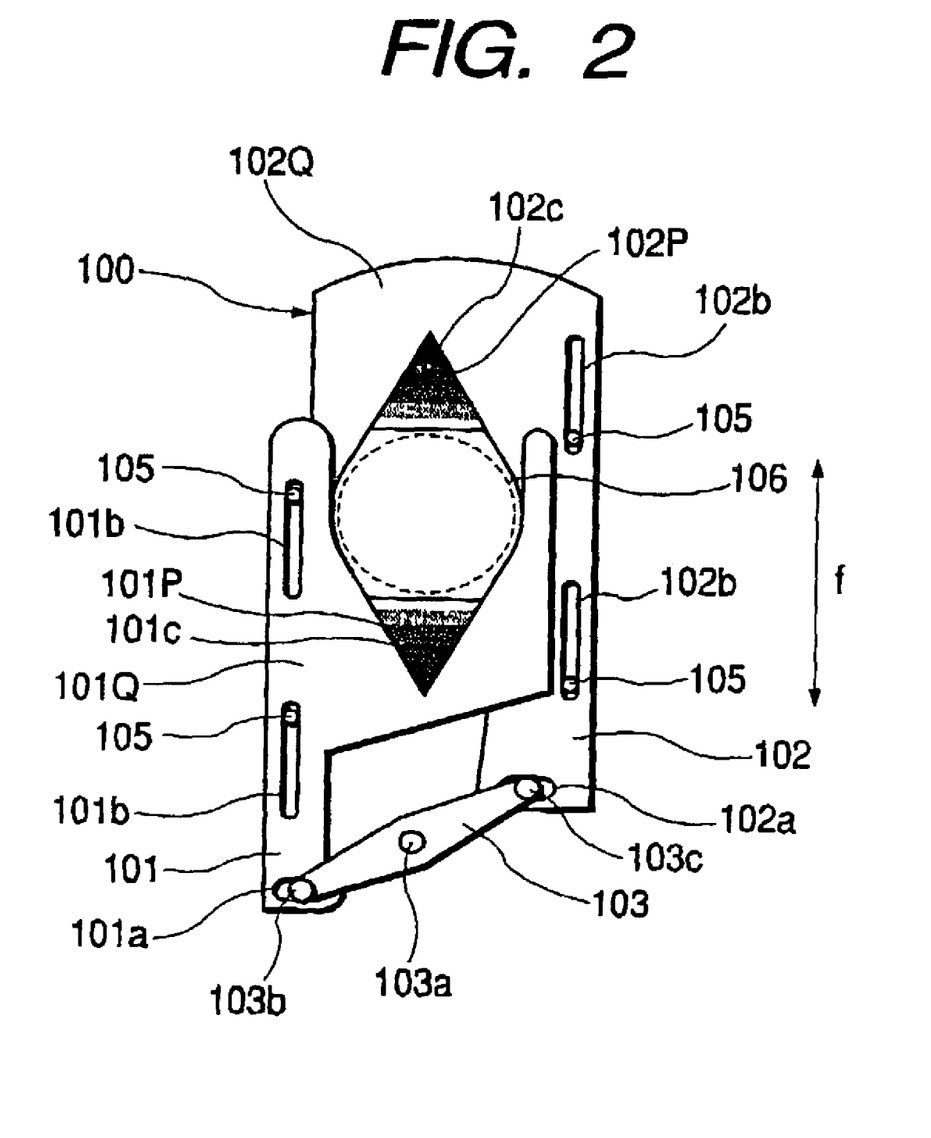
FIG. 2 illustrates a light amount adjustment device using the diaphragm blade shown in FIGS. 1A and 1B.

The light amount adjustment device obtained by the production process according to this embodiment will hereinafter be described. This embodiment is not limited to the constitution described below FIGS. 1A and 1B illustrate a diaphragm blade equipped with the light amount adjustment member according to this embodiment. FIG. 2 illustrates a diaphragm blade device equipped with such a light amount adjustment member. FIG. 1A is a plan vies of the diaphragm blade, and FIG. 1B is a cross-sectional view of the diaphragm blade taken along the line 1B-1B in FIG. 1A and viewed from a direction of an arrow. Description is given herein taking a diaphragm device used as a light amount adjustment device in a video camera or the like as an example. Reference numerical 101 in FIG. 1A indicates the whole diaphragm blade that is constructed by a light amount adjustment member 101P (gradation portion in FIG. 1A) to which a prescribed transmittance has been imparted, and a light interrupting member 101Q (another portion than the gradation portion) for interrupting light. Reference numeral 111 in FIG. 1B indicates a transparent base material, and reference numeral 112 is a colored layer having a light amount adjustment region formed in such a manner as described above. In the light amount adjustment member illustrated, a flattening layer 114 composed of a transparent resin layer is provided on both colored layer 112 and light interrupting member 101Q. In addition, an antireflection coating 113 is provided on the outermost surfaces of both sides thereof. In FIGS. 1A, 1B and 2, the light interrupting member 101Q is not colored for the purpose of making a boundary with the light amount adjustment member 101P clear. However, it is naturally colored black or the like because it serves to interrupt light.

FIG. 2 illustrates a light amount adjustment device using the diaphragm blade shown in FIGS. 1A and 1B. In FIG. 2, reference numeral 100 indicates the whole light amount adjustment device. Reference numeral 101 is the first diaphragm blade shown in FIGS. 1A and 1B, and reference numeral 102 is the second diaphragm blade. The second diaphragm blade 102 is produced in the same process as in the first diaphragm blade and has a light amount adjustment member 102P and a light interrupting member 102Q. Reference numeral 103 indicates a diaphragm-blade-driving lever that is fitted on a shaft of a motor (not illustrated) at a hole 103a and turned on the hole 103a. The first diaphragm blade 101 and second diaphragm blade 102 are engaged at the respective slots 101a and 102a with projected pins 103b and 103c provided at both ends of the diaphragm blade driving lever 103. Reference numeral 105 indicates a guide pin for a bottom plate (not illustrated) that is relatively slideably engaged with respective grooves 101b and 102b at side edges of the first and second diaphragm blades 101 and 102, 106 an optical path hole provided through the bottom plate, 101c and 102c respective opening edges of the first and second diaphragm blades 101 and 102.

FIG. 2 illustrates a state that the diaphragm has been fully opened. When the diaphragm is closed from the state fully opened, the optical path hole 106 that is an opening of the diaphragm is shut off by the respective light amount adjustment members 101P and 102P, to which a prescribed light transmittance has been imparted, of the first and second diaphragm blades, and the opening diameter is made small, so that the transmittance (light quantity) of a beam passing through the optical path 106 is gradually reduced.

Figure 3:
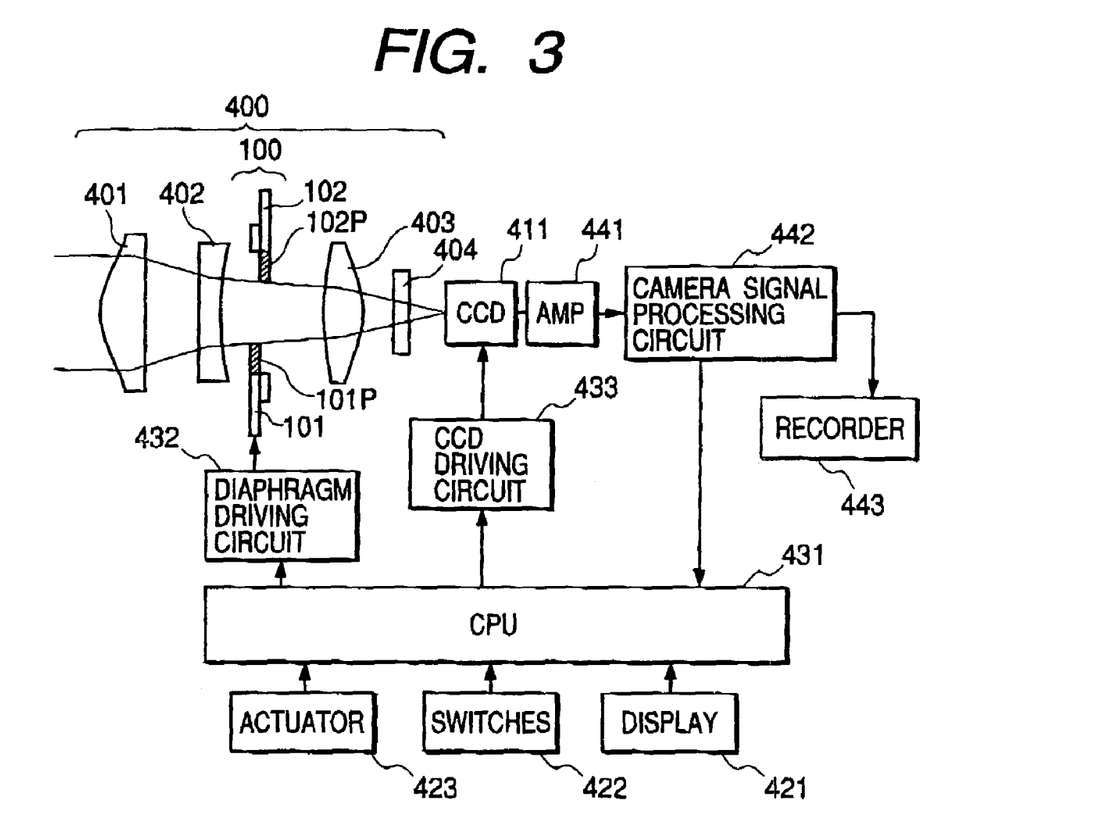
FIG. 3 illustrates the construction of a photographing device in which the light amount adjustment device shown in FIG. 2 has been incorporated.

FIG. 3 schematically illustrates an example where the light amount adjustment device shown in FIG. 2 has been arranged into an optical device. In this embodiment, the optical device is described taking a digital camera, in which a motion picture image or still picture image is photoelectrically converted into an electrical signal by a image pickup means, and this signal is stored as digital data, as an example. Reference numeral 400 indicates a photographing optical system composed of a plurality of lens groups that is constructed by a first lens group 401, a second lens group 402, a third lens group 403 and the diaphragm device 100 illustrated in FIG. 2. The first lens group 401 is a fixed front lens group, the second lens group 402 is a variator lens group, the third lens group 403 is a focusing lens group, and reference numeral 404 indicates an optical low-pass filter. An image pickup means 411 is arranged at a focal position (predetermined image-forming surface) in the photographing optical system 400. As this means, is used a photoelectrically converting means such as a two-dimensional CCD composed of a plurality of photoelectric converter parts in which irradiation light energy is converted into electric charge, an electric charge-storing part that stores the electric charge and an electric charge-transferring part in which the electric charge is transferred and sent to the outside. The image pickup means 411 is driven by an image pickup means-driving circuit 433.

Reference numeral 421 indicates a display device such as a liquid crystal display, which displays a subject image taken by the image pickup means 411 such as CCD, and operation conditions of the optical apparatus. Reference numeral 422 indicates a group of operation switches composed of a zooming switch, a photographing set up switch, a photographing start switch and a photographing condition switch that presets a shutter speed or the like. Reference numeral 423 indicates an actuator by which focusing drive is conducted to control a focusing condition of the photographing optical system 400, and other members are driven.

CPU 431 calculates whether the degree of an average density taken in coincides with a numerical value corresponding to a correct exposure stored therein or not. When a difference occurs, a diaphragm opening is changed according to an absolute value between the difference and an absolute character, or the electric charge storing time to the image pickup means 411 is changed. When the diaphragm is operated, the diaphragm blade-driving lever 103 is turned on the hole 103a by a diaphragm driving circuit 432, thereby vertically sliding the diaphragm blades 101 and 102. Thereby, the size of the optical path hole 106 that is an opening is changed. The diaphragm opening area or electric charge storing time is changed in such a manner, whereby the correct exposure can be achieved.

The subject image formed at the correct exposure on the image pickup means 411 is converted into an electric signal as a charged quantity for every pixel according to the intensity of the brightness thereof and amplified in an amplifying circuit 441 and then subjected to processing such as prescribed γ compensation in a camera signal processing circuit 442. Incidentally, this processing may be conducted by digital signal processing after A/D conversion. A video signal produced in such a manner is stored in a recorder 443.

Second Embodiment

The production process of a light amount adjustment member according to this embodiment comprises the steps of first applying a coloring liquid containing a transparent resin and a coloring material on to a transparent base material by means of a liquid jet recording process and curing the transparent resin to form a light amount adjustment region having a particular optical density. Materials used in the production process according to this embodiment will hereinafter be described.

As with the first embodiment, no particular limitation is imposed on the transparent base material usable in this embodiment so far as it has necessary properties such as mechanical strength as a light amount adjustment member and optical properties. As examples thereof, may be mentioned transparent films composed of polyethylene terephthalate, diacetate, triacetate, cellophane, celluloid, polycarbonate, polyimide, polyvinyl chloride, polyvinylidene chloride, polyacrylate, polyethylene, polypropylene or the like. Transparent glass may also be used as the base material so far as it satisfies the above-described necessary properties. The surface of the transparent base material suitably selected from the above-mentioned materials may be subjected to various kinds of treatments such as plasma treatment, UV treatment, UV ozone treatment, corona treatment and silane coupling treatment to modify the surface of the transparent base material. In some cases, these treatments may serve to control the spread of the coloring liquid and improve the adhesiveness when the coloring liquid is applied on to the transparent base material to form a colored part.

The coloring liquid applied to the transparent base material will be now described. As the coloring liquid used in this embodiment, is used that containing at least a transparent resin and a coloring material. The transparent resin used at this time is desirably slightly colored in a visible light range. However, no particular limitation is imposed on the transparent resin so far as the transparent resin making up the coloring liquid functions as a binder for the coloring material contained in the coloring liquid, such as a pigment, by being cured and forming a film to fix the coloring material to the transparent base material, and so far as optical properties imparted to the transparent base material by the coloring material making up the coloring liquid are not impaired.

Examples of the transparent resin include polyester resins, alkyd resins, polyurethane resins, polystyrene resins, acrylic resins, nylon resins, epoxy resins, vinyl chloride resins, butyral resins and polyimide resins. In this embodiment, the coloring liquid is preferably ejected from, for example, a micro liquid droplet ejecting apparatus such as an ink-jet recording apparatus when the coloring liquid is applied on to such a transparent base material as described above. Therefore, such a hydrophilic resin material as described below is preferably used as the transparent resin.

Examples of the hydrophilic transparent resin material include natural polymers such as lignin sulfonic acid salts and shellac; anionic polymers, such as polyacrylic acid salts, styrene-acrylic acid copolymer salts, styrene-acrylic acid-alkyl acrylate copolymer salts such as styrene-acrylic acid-ethyl acrylate copolymer salts, styrene-maleic acid copolymer salts, styrene-maleic acid-alkyl acrylate copolymer salts, styrene-maleic acid half ester copolymer salts, styrene-methacrylic acid copolymer salts, vinylnaphthalene-acrylic acid copolymer salts, vinylnaphthalene-maleic acid copolymer salts, β-naphthalenesulfonic acid-formalin condensate salts, and polyphosphates; polyvinyl alcohol; methylol melamine polyvinyl pyrrolidone; and cellulose derivatives such as methyl cellulose, hydroxymethyl cellulose and carboxymethyl cellulose. In this embodiment, one of these resins may be chosen for use, or a mixture of at least two resins thereof may be used. Besides, there may be mentioned a great number of resins, such as natural resins such as albumin, gelatin, casein, starch, cationic starch, gum arabic and sodium alginate. It goes without saying that this embodiment is not limited thereto.

Since the coloring liquid containing such a transparent resin material as described above is preferably ejected by the micro liquid droplet ejecting apparatus or the like and applied on to the transparent resin as described above, the same coloring liquid as that described in the first embodiment may be used as the coloring liquid used in this embodiment.

Besides, the coloring liquid used in this embodiment generally contains a solvent for the purpose of dissolving or dispersing the transparent resin described above and the coloring material therein. As a hydrophilic solvent, may be used water or a mixture of water and various kinds of water-soluble organic solvents. As the water-soluble organic solvents used at this time, may be used the same solvents as the organic solvents described in the first embodiment.

In order to provide a coloring liquid having desired physical properties desired in this embodiment, various kinds of the additives described in the first embodiment, may be added to the coloring liquid used in this embodiment in addition to the above-described components as needed.

In the production process according to this embodiment, the coloring liquid having such constitution as described above is ejected on such a transparent base material as mentioned above by means of an apparatus such as a micro liquid droplet ejecting apparatus to apply the coloring liquid on to the transparent base material, thereby forming a colored part that is a region having a particular optical density.

Examples of a micro liquid droplet ejecting system applicable for ejecting the coloring liquid and applying it on to the transparent base material, which can be used at this time, include that of the Bubble Jet (trademark) type in which an electrothermal converter is used as an energy-generating element, or that of the piezo-jet type in which a piezoelectric element is used. In this embodiment, any of the micro liquid droplet ejecting apparatus having these functions may be used. Commercially available various printers are included in micro liquid droplet ejecting apparatus as printers. In this embodiment, any of these apparatus may be used. It goes without saying that the present invention is not limited thereto, and a printer exclusively produced for this embodiment may also be used.

The colored part formed on the transparent base material by the production process according to this embodiment may be made into various kinds of patterns according to the purpose in such a manner that the region has a particular optical density. For example, the colored part may be made into a region having an even optical density. A gradation pattern with such a stepwise density gradient as shown in FIG. 4 may also be allowed. Further, the pattern may be a gradation pattern (not illustrated) in such a state that stepwise difference in density is indefinite with a continuous density gradient provided. The region, in which the optical density has been changed continuously or stepwise, can be easily formed by installing a plurality of inks whose densities differ from each other stepwise as coloring liquids installed in such a printer as described above, or by using these inks and suitably controlling the quantity of the inks ejected.

In order to suitably retain optical properties that may be affected by the optical thickness and surface roughness of the resulting light amount adjustment member, it is preferred that the liquid droplet volume and impact dot diameter of the coloring liquid applied by a liquid droplet jet recording process be smaller because a difference in receptive layer thickness caused by a local difference in the quantity of the coloring liquid applied becomes small. For such reasons, the coloring liquid is preferably applied in such a manner that the area of one dot of the coloring liquid formed by applying the coloring liquid on to the layer amounts to at most a twentieth of the area of the light amount adjustment region, preferably at most a fiftieth of the area. It is desirable that the light amount adjustment region be equivalent to or somewhat greater than the diameter of a beam to be controlled. The diameter of the beam herein depends on optical specifications (focal length, F number, etc.) of an optical system of which the light quantity control device is applied. However, it is considered to be at most about 5 mm.

The surface roughness (Ra) of the resulting light amount adjustment region is preferably at most 5/1, more preferably at most $\frac{1}{10}$ of the wavelength of light the light quantity of which is to be controlled.

According to the production process of the light amount adjustment member by this embodiment, a light amount adjustment member having a light amount adjustment region having a density gradient that the optical density varies continuously or stepwise can be simply produced. Since flexibility of the optical density gradient pattern formed is high according to the process of this embodiment, the production process has a such merit that optical optimization to the properties desired for the light amount adjustment member is made easy.

In the production process of the light amount adjustment member according to this embodiment, after the coloring liquid is applied on to the transparent base material in the above-described manner, the transparent resin material in the coloring liquid thus applied is required to be dried or preferably formed into a film. When curing such a transparent resin, a hot air drying oven, heated drum, hot plate or the like may be used. In particular, when a crosslinking agent for the transparent resin is mixed into the coloring liquid, it is preferred that after the coloring liquid is applied on to the transparent base material, heating or light irradiation be conducted according to the kind of the crosslinking agent used to carry out a crosslinking and curing treatment of the transparent resin contained in the coloring liquid to form a film.

In the process according to this embodiment, the colored resin film is formed on the transparent base material in the above-described manner to become a light amount adjustment region. When partial irregularities are formed on the surface of the light amount adjustment region formed, a flattening layer is provided on the surface of the light amount adjustment region to make the optical properties even. Such a flattening layer is useful for more improving the performance of the light amount adjustment member according to this embodiment.

No particular limitation is imposed on a material usable in the formation of the flattening layer at this time so far as it satisfies necessary performance such as adhesiveness to the resin forming the light amount adjustment region, mechanical strength and optical properties. Specifically, for example, an acrylic or epoxy thermosetting resin or photo-setting resin may be suitably used. As a process for forming the flattening layer, may be used a process in which a coating formulation comprising such a resin material is applied on to the surface of the light amount adjustment region to form a coating film, and the base material is then baked by means of an oven, hot plate or the like to form a cured coating film, or a process in which the base material is irradiated with an electron beam, ultraviolet light or the like to form a cured coating film. The thickness of the flattening layer formed at this time varies according to required performance. However, the thickness is suitably, for example, about 0.1 to 30 μm.

As means for solving the partial irregularities caused on the surface of the light amount adjustment region, may also be suitably used a process in which the surface is subjected to a polishing treatment to flatten the surface. As polishing methods for the purpose of flattening conducted at this time, methods such as tape polishing and buffing are considered. In this embodiment, the buffing may be suitably used in particular. The buffing is a method in which abrasives are provided on the surface of a polishing base, and a portion to be polished of the base material is brought into contact with the polishing base while the polishing base is rotated, thereby polishing the surface layer of the base material by the abrasives.

Figure 5:
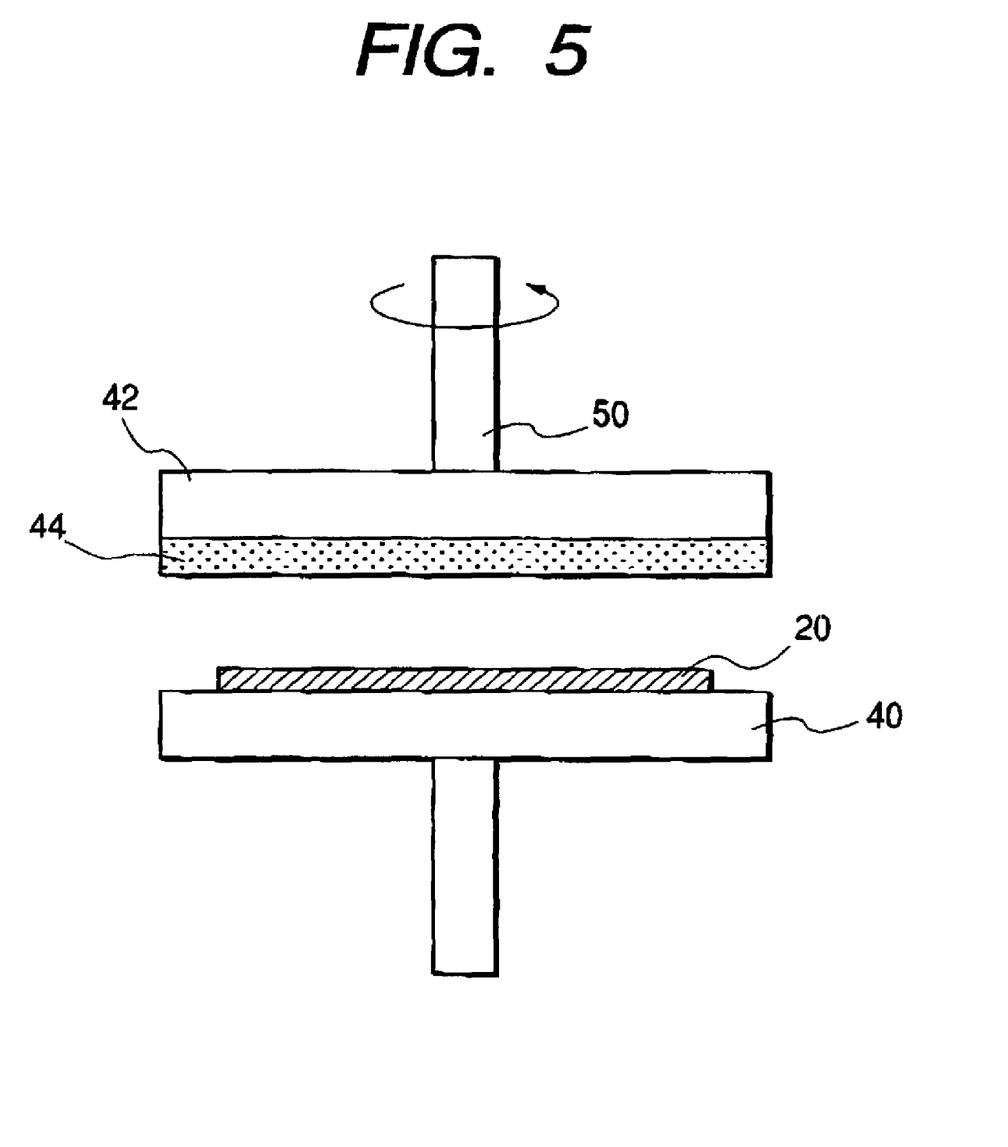
FIG. 5 typically illustrates the construction of a polishing apparatus used in the production of a light amount adjustment member.

FIG. 5 illustrates the construction of a polishing apparatus for carrying out the flattening method by the buffing. As illustrated in FIG. 5, the polishing apparatus 50 is equipped with a lower holder part 40 for sucking and holding a light amount adjustment member 20 and an upper holder part 42 provided in an opposed relation to the lower holder part 40. In an example illustrated in FIG. 5, a polishing member 44 with abrasives in the form of fine particles penetrated into a porous polishing base is installed on the lower surface of the upper holder part 42. The upper holder part 42 is rotated while the polishing member 44 provided on the lower surface of the upper holder part 42 is brought into contact with the surface of the light amount adjustment member 20 sucked and held by the lower holder part 40. Thereby, the surface of the light amount adjustment member 20 is polished by the abrasives to become a flat surface free of irregularities. As the polishing base used in the polishing member 44, is preferably used, for example, a porous substance such as nonwoven fabric or suede. In the apparatus shown in FIG. 5, the nonwoven fabric is used. As the abrasives, fine inorganic oxide particles or the like may be used. In this embodiment, fine inorganic oxide particles comprising alumina as a main component may be preferably used. The particle diameter of the abrasives used is preferably controlled to, for example, about 0.001 to 0.3 μm.

In this embodiment, the same anti-reflection coating as that described in the first embodiment may also be formed on both surfaces of the light amount adjustment member obtained in the above-described manner as illustrated in FIG. 1B. The light amount adjustment member obtained by the production process according to this embodiment may be used in light amount adjustment devices and photographing apparatus like the light amount adjustment member described in the first embodiment.

The present invention will hereinafter be described in more detail by the following Examples. Incidentally, all designations of "part" or "parts" and "%" as will be used in the following examples mean part or parts by mass and % by mass unless expressly noted.

When the quality of a light amount adjustment member is judged, it is necessary to evaluate three items of (1) deterioration of optical performance caused by the fact that a beam is scattered or refracted by a coloring material when it is used singly, (2) a diffraction-preventing effect when it is used being incorporated into a diaphragm device or the like, and (3) spectral transmittance.

The description of the item (3) is omitted because the properties of a filter can be freely controlled according to the kind of a coloring material used, and the spectral transmittance can be simply measured by means of a commercially available spectral transmissometer. On the other hand, the evaluation item (2) is not suitable for evaluating the optical properties of the light amount adjustment member itself because factors such as the form of a diaphragm blade and a diaphragm value (F-number) upon evaluation greatly affect the evaluation result. In order to evaluate the optical properties of the light amount adjustment member itself, the method of the item (1) is suitable. Therefore, in respective Examples, which will be described subsequently, the measured results of optical properties of a light amount adjustment member itself, having not a gradation pattern but uniform density distribution pattern, produced according to the production process in each Example were described

EXAMPLE 1

An aqueous solution containing polyvinyl alcohol (Gohsenol GM-14L, trade name, product of The Nippon Synthetic Chemical Industry Co., Ltd.) at a concentration of 10 parts in terms of solid content was prepared. The coating formulation thus obtained was applied on to a polyethylene terephthalate film having a diameter of 5 mm as a transparent base material by means of a wire bar and dried under a condition of 100° C. and 5 minutes in a hot air drying oven. The thickness of the layer capable of absorbing and receiving a coloring liquid thus formed was 7 μm.

A coloring liquid composed of the following composition was charged into an ink tank of an ink-jet printer (BJS600, trade name; manufactured by Canon Inc.) of the Bubble Jet (trademark) type that an electrothermal converter was used as an energy-generating element and applied on to the layer capable of absorbing and receiving the coloring liquid formed above. At this time, the coloring liquid was applied in such a manner that the optical density becomes an even density (0.5; transmittance: 32%).

| | |
|---|---|
| Black pigment (water-dispersing carbon black; IJX-102B, trade name, product of Cabot Co.) | 4% |
| Ethylene glycol | 5% |
| Diethylene glycol | 5% |
| Isopropyl alcohol | 2% |

-continued

| | |
|---|---|
| Acetylenol EH (trade name, product of Kawaken Fine Chemical Co., Ltd.) | 1% |
| Ion-exchanged water | 78%. |

A transparent flattening layer was provided in the following manner on the light amount adjustment region formed by applying and receiving the coloring liquid. A coating formulation for forming the flattening layer was first prepared in the following manner. A styrene-butadiene copolymer (TR2000C, trade name, product of JSR K.K.) was used to prepare a coating formulation composed of a toluene/methyl ethyl ketone solution containing the copolymer at a concentration of 10 parts in terms of solid content. This coating formulation was then applied on to the colored layer by means of a wire bar. The coating formulation was further dried under a condition of 100° C. and 5 minutes in a hot air drying oven, thereby forming a flattening layer. The thickness of the flattening layer thus formed was measured and found to be 5 μm. The surface roughness (Ra) thereof was 20 nm.

The light amount adjustment member according to this example produced in the above-described manner was arranged in the front of a photographing lens of a digital camera (Power Shot G1, trade name, manufactured by Canon Inc.) to take a photograph of an ISO standard resolving power chart for electronic still camera. As an exposure control mode, an aperture-priority AE by opening of a diaphragm was used in such a manner that a correct exposure is achieved irrespective of the presence of the light amount adjustment member. A white-black bar chart (spatial frequency at an image surface: 14.5 line pairs/mm) was cut out of the image photographed to find a difference between a level at the white portion and a level at the black portion in the image. This difference was regarded as an evaluated contrast. The light amount adjustment member was removed to conduct the same photographing work, thereby finding a difference between a level at the white portion and a level at the black portion in the image. This difference was regarded as a reference contrast.

The ratio of the evaluated contrast to the reference contrast was found from the values thus obtained, and this ratio was determined as a filter contrast. In the case of the light amount adjustment member obtained in this example, this value was 0.93. The acceptable lower limit value of the filter contrast varies according to uses of a photographing apparatus and a price region. However, it is generally known that the value is preferably at least 0.9 for photographing apparatus of the popularization class and at least 0.92 for photographing apparatus of the high class. From this fact, it is understood that the filter contrast value, 0.93 of the light amount adjustment member obtained in this example is of sufficiently high performance.

The diameter of a dot of the coloring liquid on the receptive layer was 20 μm.

EXAMPLE 2

An aqueous solution containing polyvinyl pyrrolidone (K-30, trade name, product of Tokyo Kasei Kogyo Co., Ltd.) at a concentration of 10 parts in terms of solid content was first prepared. The coating formulation thus obtained was applied on to a polyethylene terephthalate film as a transparent base material by means of a wire bar and dried under a condition of 120° C. and 10 minutes in a hot air drying oven. The thickness of the layer (hereinafter referred to as "receptive layer") capable of absorbing and receiving a coloring liquid thus formed was 10 μm.

A coloring liquid composed of the following composition was charged into an ink tank of an ink-jet printer (BJS600, trade name; manufactured by Canon Inc.) of the Bubble Jet (trademark) type that an electrothermal converter was used as an energy-generating element. The coloring liquid was applied on to the receptive layer formed above by means of the ink-jet printer in such a manner that the optical density becomes an even density (0.5; transmittance: 32%)

| | |
|---|---|
| Black dye (Food Black 2) | 5% |
| Ethylene glycol | 5% |
| Diethylene glycol | 5% |
| Isopropyl alcohol | 2% |
| Acetylenol EH (trade name, product of Kawaken Fine Chemical Co., Ltd.) | 1% |
| Ion-exchanged water | 77%. |

A transparent flattening layer was provided in the following manner on the colored layer obtained by applying the coloring liquid in the above-described manner. A styrene-butadiene copolymer (TR2000C, trade name, product of JSR K.K.) was first used to prepare, as a coating formulation, a toluene/methyl ethyl ketone solution containing the copolymer at a concentration of 10 parts in terms of solid content. This coating formulation was then applied on to the colored layer formed above by means of a wire bar and further dried under a condition of 100° C. and 5 minutes in a hot air drying oven, thereby forming a flattening layer. The thickness of the flattening layer thus formed was measured and found to be 5 m.

With respect to the light amount adjustment member according to this example produced in the above-described manner, a contrast value was found in the same manner as in EXAMPLE 1. As a result, it was found that the contrast value was 0.92 and was of high performance.

EXAMPLE 3

A light amount adjustment member was produced in the same manner as in EXAMPLE 1 except that the coloring liquid was not evenly applied over the whole surface of the transparent base material when the coloring liquid was applied, but the coloring liquid was applied with a stepwise density gradient in such a manner that the colored portion becomes such a gradation pattern as shown in FIG. 4. With respect to the light amount adjustment member according to this example produced in such a manner, a contrast value was found in the same manner as the case of the light amount adjustment member obtained in EXAMPLE 1 to evaluate it. As a result, the contrast value was 0.93 and was of high performance.

EXAMPLE 4

A light amount adjustment member was produced in the same manner as in EXAMPLE 1 except that the coloring liquid was not evenly applied over the whole surface of the transparent base material when the coloring liquid was applied, but the coloring liquid was applied with a continuous density gradient in such a manner that the stepwise difference in density is indefinite. With respect to the light amount adjustment member according to this example produced in such a manner, a contrast value was found in the same manner as the case of the light amount adjustment member obtained in EXAMPLE 1 to evaluate it. As a result, the contrast value was 0.93 and was of high performance.

EXAMPLE 5

An anti-reflection coating formed of a vapor deposition multi-layer film of inorganic materials was formed on both surfaces of the light amount adjustment member obtained in EXAMPLE 1 in the same manner as described in Japanese Patent Application Laid-Open No. 06-273601 (see FIG. 1B). This antireflection coating is composed of a multi-layer film of an undercoat layer vapor-deposited on each surface and a multi-layer film deposited thereon, which is a repeated multi-layer film. More specifically, the undercoat layer is a thin film having a film thickness of about 300 nm formed of a low-refractive index material having a refractive index n of about 1.5 comprising, as a main component, silicon oxide $SiO_x$ ($2 \geqq x \geqq 1$) having good adhesiveness to the surface and excellent chemical resistance and wear resistance. The multi-layer film deposited on the undercoat layer is formed of a thin film of a first layer composed of a high-refractive index material comprising, as a main component, a mixture of titanium oxide $TiO_2$ and zirconium oxide $ZrO_2$, a thin film of a second layer deposited thereon and composed of a low-refractive index material comprising, as a main component, silicon oxide $SiO_x$ ($2 \geqq x \geqq 1$), a thin film of a third layer deposited thereon and composed of a high-refractive index material comprising, as a main component, a mixture of titanium oxide $TiO_2$ and zirconium oxide $ZrO_2$, and a thin film of a fourth layer deposited thereon and composed of a low-refractive index material comprising, as a main component, silicon oxide $SiO_x$ ($2 \geqq x \geqq 1$). With respect to the light amount adjustment member according to this example produced in such a manner, a contrast value was found in the same manner as in EXAMPLE 1 to evaluate it. As a result, the contrast value was 0.93 and was of high performance.

EXAMPLE 6

A transparent polyethylene terephthalate film having a thickness of 100 μm was used as a transparent base material. A coloring liquid composed of the following composition was charged into an ink tank of an ink-jet printer (BJS600, trade name; manufactured by Canon Inc.) of the Bubble Jet (trademark) type that an electrothermal converter was used as an energy-generating element, and these were used to form a colored portion on the transparent base material. When the coloring liquid was applied by the printer at this time, the coloring liquid was applied in such a manner that the colored portion formed becomes an even density region having an optical density of 0.5 (transmittance: 32%). After the coloring liquid was applied, the coloring liquid was heated and dried at 120° C. for 20 minutes in a hot air drying oven to form a film by a styrene-maleic acid resin contained in the coloring liquid, thereby forming the colored portion. The colored portion formed herein is composed of a colored resin layer with carbon black bound by the styrene-maleic acid resin formed into the film.

| | |
|---|---|
| Black pigment (water-dispersing carbon black; IJX-102B, trade name, product of Cabot Co.) | 4% |
| Monoethanolamine salt of styrene-maleic acid resin (average molecular weight: 20,000, acid value: 300) | 3% |

-continued

| | |
|---|---|
| Ethylene glycol | 10% |
| Diethylene glycol | 15% |
| Isopropyl alcohol | 2% |
| Ion-exchanged water | 66%. |

A transparent flattening layer was additionally provided in the following manner on the surface of the colored resin layer that was the colored portion formed in the above-described manner. A coating formulation containing a styrene-butadiene copolymer (TR2000C, trade name, product of JSR K.K.) was first prepared by using a toluene/methyl ethyl ketone solution in such a manner that the copolymer amounts to 10 parts in terms of solid content. This coating formulation was applied on to the colored portion by means of a wire bar and dried under a condition of 100° C. and 10 minutes in a hot air drying oven. The thickness of the flattening layer thus formed was 5 μm.

With respect to the light amount adjustment member according to this example produced in the above-described manner, a contrast value was found in the same manner as in EXAMPLE 1. As a result, it was found that the film contrast value was 0.92 and was of sufficiently high performance.

EXAMPLE 7

A colored portion was formed in a transparent polyethylene terephthalate film having a thickness of 100 μm in substantially the same manner as in EXAMPLE 1 except that a coloring liquid composed of the following composition was charged into an ink-jet printer similar to that used in EXAMPLE 1. The colored portion formed was composed of an even density region having an optical density of 0.5 (transmittance: 32%) like EXAMPLE 6.

| | |
|---|---|
| Black dye (Food Black 2) | 5% |
| Hydroxypropyl cellulose (HPC-H, trade Name, product of Nippon Soda Co., Ltd.) | 1% |
| Ethylene glycol | 10% |
| Diethylene glycol | 15% |
| Isopropyl alcohol | 2% |
| Acetylenol EH (trade name, product of Kawaken Fine Chemical Co., Ltd.) | 1% |
| Ion-exchanged water | 66%. |

A flattening layer was then provided in the following manner on the surface of the colored resin layer that was the colored portion. A toluene/methyl ethyl ketone solution containing a styrene-butadiene copolymer (TR2000C, trade name, product of JSR K.K.) in an amount of 10% in terms of solid content was first prepared as a coating formulation. This coating formulation was applied on to the colored portion by means of a wire bar. The coating formulation was then dried under a condition of 100° C. and 10 minutes in a hot air drying oven. The thickness of the flattening layer thus formed was 5 μm. The light amount adjustment member according to this example produced in the above-described manner was used to find a contrast value in the same manner as in EXAMPLE 1. As a result, it was found that the film contrast value was 0.93 and was of high performance.

EXAMPLE 8

A light amount adjustment member was produced in the same manner as in EXAMPLE 6 except that the optical density of the colored portion upon the application of the ink by the ink-jet printer was uneven unlike the case of EXAMPLE 6, but was changed in such a manner that the density gradient varies stepwise as shown in FIG. 4. The light amount adjustment member obtained according to this example was evaluated in the same manner as in EXAMPLE 1. As a result, the contrast value obtained was 0.93 and was of high performance.

EXAMPLE 9

A light amount adjustment member was produced in the same manner as in EXAMPLE 6 except that the optical density of the colored portion upon the application of the ink by the ink-jet printer was uneven unlike the case of EXAMPLE 6, but was changed in such a manner that the density gradient varies continuously. The light amount adjustment member obtained according to this example was evaluated in the same manner as in EXAMPLE 1. As a result, the contrast value obtained was 0.93 and was of high performance.

EXAMPLE 10

A colored portion was formed on a transparent base material in the same manner as in EXAMPLE 6.

The surface of the colored resin layer that was a colored portion formed in the above-described manner was polished by means of the surface-polishing apparatus illustrated in FIG. 5 to control the surface roughness Ra to 20 nm or lower. At this time, as the polishing member 44, that obtained by causing fine inorganic oxide particles comprising alumina as a main component as abrasives to penetrate into a nonwoven fabric as a polishing base was used. Those having a particle diameter of 0.1 µm were used as the abrasives.

The light amount adjustment member according to this example produced in the above-described manner was evaluated in the same manner as in EXAMPLE 1. As a result, the filter contrast value was 0.92.

EXAMPLE 11

A light amount adjustment member was produced in the same manner as in EXAMPLE 10 except that the optical density of the colored portion upon the application of the ink by the ink-jet printer was uneven unlike the case of EXAMPLE 6, but was changed in such a manner that the density gradient varies stepwise as shown in FIG. 4. The light amount adjustment member obtained according to this example was evaluated in the same manner as in EXAMPLE 1. As a result, the contrast value obtained was 0.92 and was of high performance.

EXAMPLE 12

A light amount adjustment member was produced in the same manner as in EXAMPLE 10 except that the optical density of the colored portion upon the application of the ink by the ink-jet printer was uneven unlike the case of EXAMPLE 6, but was changed in such a manner that the density gradient varies continuously. The light amount adjustment member obtained according to this example was evaluated in the same manner as in EXAMPLE 1. As a result, the contrast value obtained was 0.92 and was of high performance.

EXAMPLE 13

An anti-reflection coating formed of a vapor deposition multi-layer film of inorganic materials was formed on both surfaces of the light amount adjustment member obtained in EXAMPLE 6 in the same manner as described in Japanese Patent Application Laid-Open No. 06-273601 (see FIG. 1B). This antireflection coating is composed of a multi-layer film of an undercoat layer vapor-deposited on each surface and a multi-layer film deposited thereon, which is a repeated multi-layer film. More specifically, the undercoat layer is a thin film having a film thickness of about 300 nm formed of a low-refractive index material having a refractive index n of about 1.5 comprising, as a main component, silicon oxide $SiO_x$ ($2>x>1$) having good adhesiveness to the surface and excellent chemical resistance and wear resistance. The multi-layer film deposited on the undercoat layer is formed of a thin film of a first layer composed of a high-refractive index material comprising, as a main component, a mixture of titanium oxide $TiO_2$ and zirconium oxide $ZrO_2$, a thin film of a second layer deposited thereon and composed of a low-refractive index material comprising, as a main component, silicon oxide $SiO_x$ ($2 \geq x \geq 1$), a thin film of a third layer deposited thereon and composed of a high-refractive index material comprising, as a main component, a mixture of titanium oxide $TiO_2$ and zirconium oxide $ZrO_2$, and a thin film of a fourth layer deposited thereon and composed of a low-refractive index material comprising, as a main component, silicon oxide $SiO_x$ ($2 \geq x \geq 1$). With respect to the light amount adjustment member according to this example produced in such a manner, a contrast value was found in the same manner as in EXAMPLE 1 to evaluate it. As a result, the contrast value was 0.92 and was of high performance.

As described above, according to the present invention, there are provided the production processes of the light amount adjustment member, by which a light amount adjustment member that can sufficiently satisfy optical properties can be cheaply produced with good yield by a very simple operation. According to the present invention, there can also be provided the production processes of the light amount adjustment member, by which a light amount adjustment member having a continuous or stepwise density distribution that has been markedly difficult to achieve by other production methods can be simply produced while achieving satisfactory optical properties. According to the present invention, there are further cheaply provided a wide variety of light amount adjustment devices and picture-taking apparatus equipped with a light amount adjustment member excellent in optical properties according to these production processes while achieving satisfactory optical properties.

What is claimed is:

1. A process for producing a light amount adjustment member, the process comprising:
    applying a plurality of coloring liquids each containing at least a transparent resin and a coloring material on to a transparent base material by means of a liquid jet recording process; and
    curing the transparent resin to form a light amount adjustment region having a density distribution that varies continuously or stepwise,
    wherein the densities of the plurality of coloring liquids differ from each other stepwise.

2. The production process according to claim 1, which further comprises the step of providing a transparent flattening layer on the surface of the light amount adjustment region after the step of forming the light amount adjustment region.

3. The production process according to claim 1, which further comprises the step of polishing the surface of the light amount adjustment region after the step of forming the light amount adjustment region.

4. The production process according to claim 1, wherein the coloring liquid is applied in such a manner that the area of one dot of the coloring liquid formed by applying the coloring liquid on to the layer amounts to at most a twentieth of the area of the light amount adjustment region.

* * * * *